United States Patent [19]
Haynes et al.

[11] 4,156,131
[45] May 22, 1979

[54] HUB ODOMETER DAMPING MECHANISM

[75] Inventors: Jerry L. Haynes; Oliver R. Thomas, Jr., both of Elizabethtown, N.C.

[73] Assignee: Veeder Industries Inc., Hartford, Conn.

[21] Appl. No.: 837,567

[22] Filed: Sep. 28, 1977

[51] Int. Cl.² ............................................. G01C 22/00
[52] U.S. Cl. .................................. 235/95 C; 235/95 B
[58] Field of Search ................. 235/95 C, 95 B, 95 R

[56] References Cited
U.S. PATENT DOCUMENTS

| 1,209,382 | 12/1916 | Baumgaertner | 235/95 C |
| 3,130,907 | 4/1964 | Coffey | 235/95 C |

FOREIGN PATENT DOCUMENTS

| 285118 | 6/1915 | Fed. Rep. of Germany | 235/95 C |
| 2506249 | 9/1975 | Fed. Rep. of Germany | 235/95 B |

Primary Examiner—Stephen J. Tomsky
Attorney, Agent, or Firm—Prutzman, Kalb, Chilton & Alix

[57] ABSTRACT

A hub odometer having a pendulous recording mechanism with loose ball anti-orbiting means with two damping balls mounted within a radial ball track diametrally of the center of gravity of the pendulous recording mechanism and having a width in the circumferential direction approximately equal to but slightly greater than the total width of the two damping balls.

4 Claims, 4 Drawing Figures

HUB ODOMETER DAMPING MECHANISM

BRIEF SUMMARY OF THE INVENTION

The present invention relates generally to hub-mounted odometers useful in recording the revolutions of a vehicle wheel and more particularly to a new and improved damping mechanism for damping angular motion of the usual pendulous mass of such hub odometers.

It is well known that road irregularities, as well as vehicle acceleration and deceleration, may cause oscillatory motion and orbital rotation of the pendulous mass of a hub odometer. Since accurate operation of the hub odometer depends upon nonrotation of the suspended or pendulous mass for properly recording the revolutions of the vehicle wheel, it is extremely important that the pendulous mass be effectively restrained against such orbital rotation.

Therefore, it is a principal aim of the present invention to provide a new and improved damping mechanism for a hub-mounted odometer for damping road irregularity caused rotation and oscillation of the pendulous mass of the hub odometer and for thereby reducing or eliminating orbital rotation of the pendulous mass and the resulting odometer error.

It is another aim of the present invention to provide a new and improved loose ball type damping mechanism for the pendulous mass of a hub odometer.

It is a further aim of the present invention to provide in a hub odometer, a simple, compact and effective damping system for the pendulous mass of the hub odometer.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
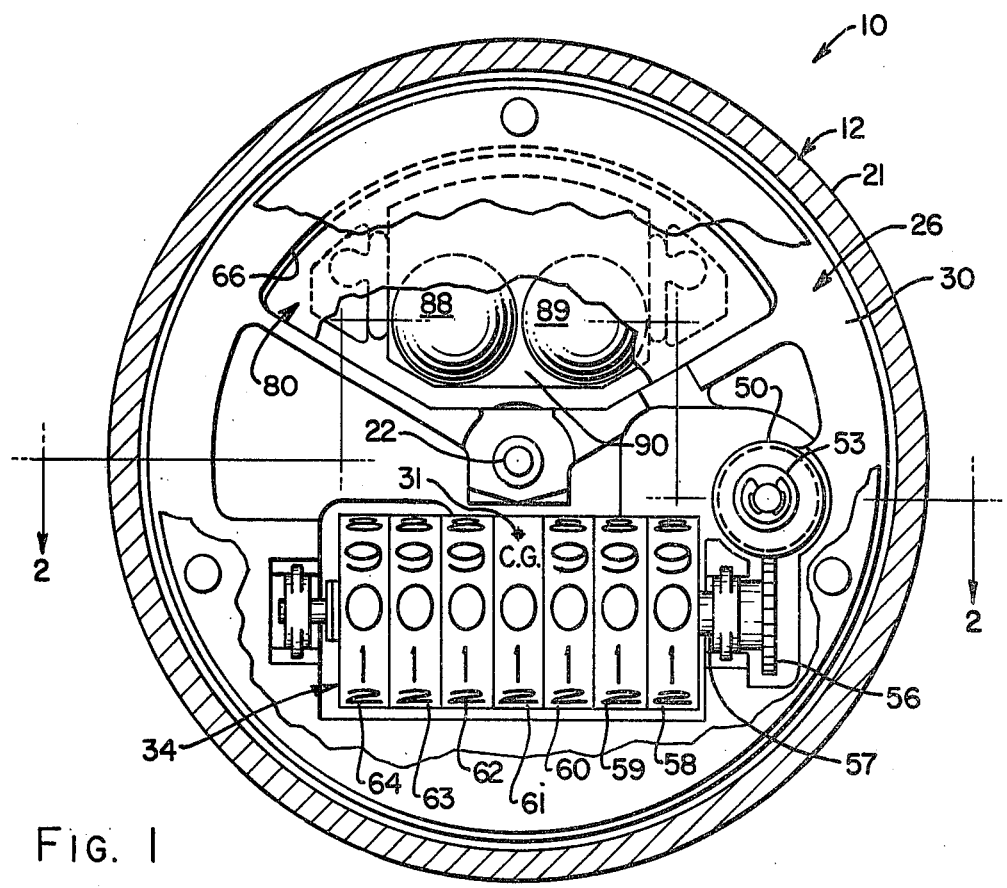
FIG. 1 is a front section view, partly broken away and partly in section, of a hub odometer incorporating an embodiment of the present invention, taken substantially along line 1—1 of FIG. 2.

Referring now to the drawings in detail, a hub odometer 10 incorporating an embodiment of an anti-orbiting mechanism of the present invention is shown having a cylindrical casing 12 adapted to be mounted on a rotatable vehicle hub or wheel (not shown) to rotate coaxially with the vehicle wheel. In this specific embodiment shown, the mounting is provided by a threaded boss 13 adapted to be screwed into a threaded aperture (not shown) of the vehicle wheel hub so that no external fasteners are required. The casing 12 which is generally cup-shaped, has a rear wall 20 and is closed at its front end by a window 18 of transparent material suitably sealed to an annular sidewall 21 of the casing 12 to provide a substantially leakproof container of housing. A supporting shaft 22 is nonrotatably fixed within the housing coaxial with the casing 12 and therefore coaxial with the wheel hub and wheel to which the hub odometer is attached. The rear wall 20 of the casing is formed with an integral eccentric or cam 24 for indexing a hub odometer counter 34 as described more fully hereinafter.

A recording mechanism 26 having a frame 30 is rotatably mounted on the support shaft 22 within the housing formed by the casing 12 and front window 18. The recording mechanism 26 has a center of gravity (approximately at the point identified by the numeral 31 in FIG. 1) which is radially offset from its supporting shaft 22 so that the recording mechanism 26 is supported on the shaft 22 in the manner of a pendulum. Accordingly, during normal operation of the hub odometer, the pendulous recording mechanism 26 is restrained by its offset center of gravity against rotation with the wheel to which its casing 12 is attached. The resulting rotation of the casing 12 relative to the pendulous recording mechanism 26 is employed for indexing the rotary counter 34 for recording the distance or mileage traveled by the vehicle to which the hub odometer is attached.

The rotary counter 34 is indexed by the cam or eccentric 24 via an indexing mechanism 38 of the type shown and described in detail in U.S. Pat. No. 3,198,430, of Robert Hermann, dated Aug. 3, 1965 and entitled "Hubodometer". Briefly, a cam follower 54 is mounted to be oscillated by the eccentric or cam 24 about a supporting shaft 53 on which the cam follower 54 is pivotally mounted. The cam follower 54 has an integral pawl 57 engageable with the teeth of a rachet wheel 52 affixed to the shaft 53 and whereby the rachet wheel 52 is indexed one step for each revolution of the eccentric 24 or casing 12 relative to the pendulous recording mechanism 26. A suitable no-back pawl (not shown) engaging the teeth of the rachet wheel 52 is preferably provided to prevent reverse rotation of the rachet wheel 52. The rachet wheel 52 is connected to index the counter or recorder 34 via a worm 50 mounted on the shaft 53 and a worm wheel 56 mounted on a counter shaft 57 for directly rotating a lowest order numeral wheel 58 of the counter 34. The counter 34 is of conventional design having internal transfer pinions (not shown) and seven 0–9 numeral wheels 58–64 of increasing order of significance for recording the distance traveled by the wheel to which the hub odometer is attached, for example, in miles.

Figure 4:
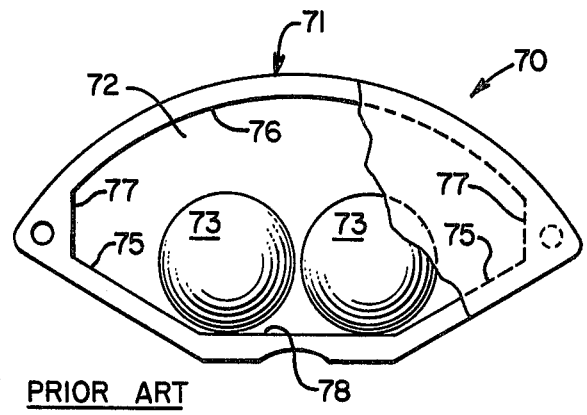
FIG. 4 is an enlarged front view, partly broken away and partly in section, similar to FIG. 3 but showing a prior art anti-orbiting mechanism.

The frame 30 of the pendulous recording mechanism 26 is formed with a sector opening 66 diametrally of the counter 34 and the center of gravity of the pendulous recording mechanism 26. A prior art loose ball assembly 70 previously inserted in the sector opening 66 of the frame 30 for damping the pendulous recording mechanism 26 is shown in FIG. 4. The prior art assembly 70 comprises a plastic sector-shaped case 71 press fit within the sector opening 66 and having a sector-shaped pocket 72 and a pair of identical steel damping balls 73 which are free to move within the pocket 72. The sector-shaped ball pocket 72 is defined by an outer circumferentially extending inwardly facing wall 76, a pair of radially extending approximately 120° angularly spaced outwardly facing sidewalls 75, a pair of circumferentially spaced opposed parallel end walls 77, and an outwardly facing bottom wall 78. Thus, as can be seen upon reference to FIG. 4, the two damping balls 73 are free to move substantially both radially and circumferentially within the pocket 72 for damping the pendulous recording mechanism 26.

Figure 2:
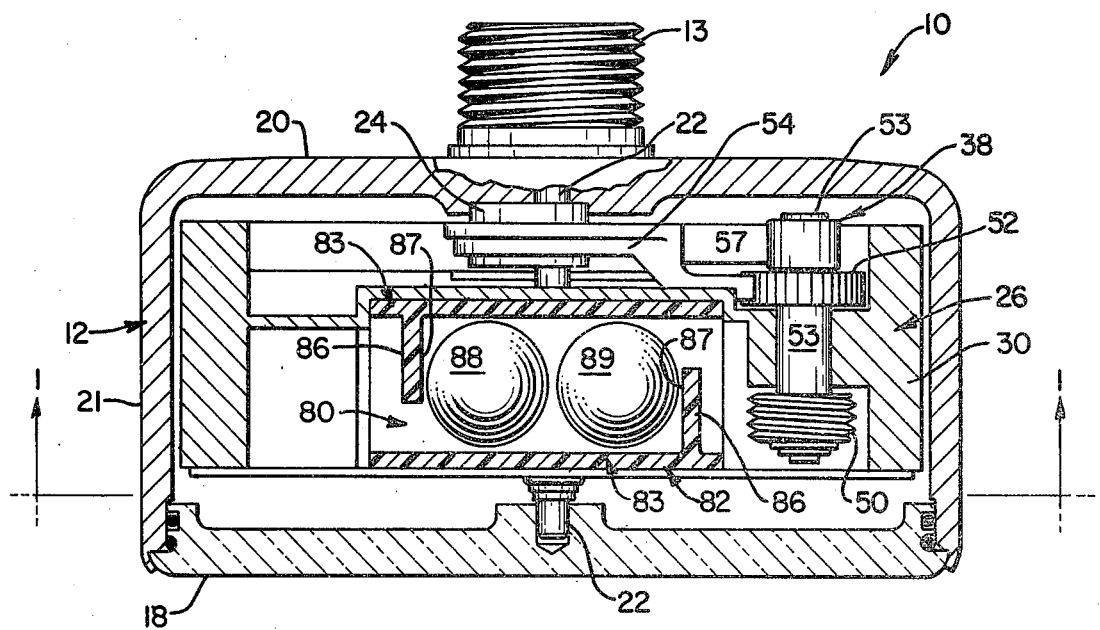
FIG. 2 is a transverse section view, partly broken away and partly in section, of the hub odometer taken substantially along line 2—2 of FIG. 1.
Figure 3:
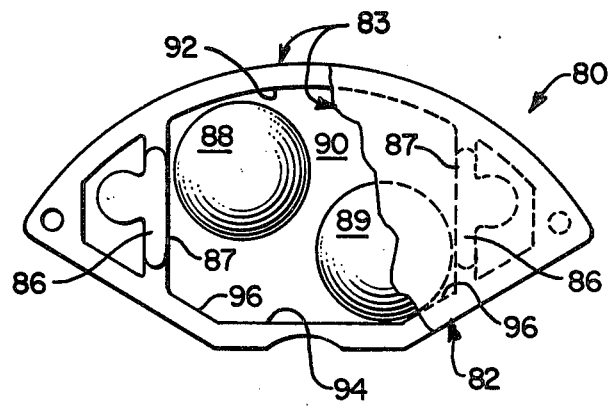
FIG. 3 is an enlarged front view, partly broken away and partly in section, of an anti-orbiting mechanism of the hub odometer.

In accordance with the present invention, a modified ball assembly 80 shown in FIGS. 1, 2 and 3 is employed in place of the prior art assembly 70 for damping the pendulous recording mechanism 26. The new ball assembly 80 comprises a plastic ball case 82 with a pair of identical suitably interfitting half-casing parts 83. The primary difference between the new ball case 82 and the prior art ball case 71 is that the new ball case 82 is formed with a pair of additional ribs 86 providing a pair of flat, opposed, parallel sidewalls 87 which substantially reduce the circumferential width of the intermediate ball pocket 90. The opposed parallel sidewalls 87 provide a radial track, diametrally of the center of gravity 31 of the pendulous recording mechanism 26, permitting substantially only radial ball movement. For that purpose, the distance between the parallel sidewalls 87, and therefore the width of the ball track in the circumferential direction, is preferably approximately equal to but slightly greater than the total width of the two damping balls 88, 89. Also, the two damping balls are preferably the same weight and diameter as shown, and whereby the width of the ball track is approximately equal to but slightly greater than twice the diameter of each damping ball 88, 89. Thus, the ball pocket or track 90 is defined by the two parallel sidewalls 87, an outer circumferentially extending and radially inwardly facing wall 92 and an inner flat, outwardly facing wall 94 providing for normally locating the two balls 88, 89 at the same radial distance from the axis of rotation of the pendulous recording mechanism 26. Also, short radially extending, generally outwardly facing corner walls 96 are provided intermediate the base wall 94 and sidewalls 87 to enable the plastic case 82 to be press fit into the existing sector-shaped cavity 66 of the frame 30.

It has been found that such a radial track 90 provides substantially improved damping effectiveness with the balls 88, 89. The ball track limits the ball movement to substantially radial movement and yet permits the two balls to bounce around slightly within the pocket for dissipating rotational energy of the pendulum mass. The improved effectiveness of the new ball system is attributed to its substantially greater effectiveness in preventing oscillation or rotation of the pendulous recording mechanism 26 accompanying vertical acceleration, principally downward vertical acceleration, of the vehicle wheel to which the hub odometer is attached. And it is believed that downward vertical acceleration of the vehicle wheel resulting from engagement with a pothole in the vehicle roadway or after the vehicle wheel passes over a bump in the roadway, is the major cause of shock produced rotation of the pendulous recording mechanism 26. The ball damping mechanism 80 has primary effectiveness in preventing such shock caused rotation because the balls shift only radially along the ball track 90 between the base 94 and outer wall 92. The balls thereby dampen the pendulum 26 by diffusing the rotational energy of the pendulum, and more significantly by engaging sidewalls 87 to counteract any shock caused rotation. In other words, during momentary downward acceleration of the odometer supporting wheel the inertia of the balls 88, 89 is immediately and continuously effective through the sidewalls 87 in opposing the pendulum inertia to restrain the pendulum against rotation. The "lever arm" through which the ball inertia is effective increases as the balls 88, 89 move outwardly along the walls 87. The sidewalls 87 prevent substantial circumferential movement of the damping balls 88, 89 and provide an effective radially extending "lever arm" against which the ball inertia acts to dampen the pendulum.

Also during horizontal acceleration and deceleration of the vehicle wheel to which the hub odometer is attached, the balls are immediately and continuously effective through the sidewalls 87 to reduce the angular impulse on the pendulum 26.

As will be apparent to persons skilled in the art, various modifications, adaptations and variations of the foregoing specific disclosure can be made without departing from the teachings of the present invention.

We claim:

1. In a hub odometer having a pendulum, a pendulum support rotatably supporting the pendulum with its center of gravity radially offset from its axis of rotation and adapted to be mounted on a vehicle wheel for rotation with the wheel coaxially with the pendulum and whereby the pendulum is restrained against rotation with the pendulum support by its radially offset center of gravity, the hub odometer having a recorder mechanism connected for recording the rotation of the support relative to the pendulum and for thereby recording the distance traveled by the vehicle wheel on which the hub odometer is mounted, and the pendulum having a ball damping mechanism for damping rotation of the pendulum, the improvement wherein the ball damping mechanism comprises a radial ball track, generally diametrally of the center of gravity of the pendulum, with angularly spaced, circumferentially opposed, parallel extending sidewalls establishing a generally constant ball track width in the circumferential direction, and at least one damping ball mounted on the radial ball track between the parallel extending sidewalls for independent substantially only radial movement along the radial track.

2. A hub odometer according to claim 1 comprising a plurality of said damping balls mounted between the parallel extending sidewalls for independent substantially only radial movement along the radial track.

3. A hub odometer according to claim 2 comprising just two said damping balls of substantially the same diameter, the circumferential width of the track between the parallel extending sidewalls being approximately the same as but slightly greater than the total width of the two balls, and the track providing for normally holding the two balls in angular alignment at substantially the same radial distance from the axis of rotation of the pendulum.

4. In a hub odometer comprising a rotatable pendulous recording mechanism having a center of gravity radially offset from its axis of rotation, a support for rotatably supporting the pendulous recording mechanism with its center of gravity radially offset from its axis of rotation and adapted to be mounted on a vehicle wheel for rotation with the wheel coaxially with the pendulous recording mechanism and whereby the pendulous recording mechanism is restrained against rotation with the support by its radially offset center of gravity, the pendulous recording mechanism being connected to the support for recording the rotation of the support relative to the pendulous recording mechanism and comprising a ball damping mechanism for damping rotation of the pendulous recording mechanism, the improvement wherein the damping mechanism comprises radial ball track means diametrally of the center of gravity of the pendulous recording mechanism, and at least one loose damping ball mounted on the radial ball track means, the radial ball means being operable for guiding each loose damping ball mounted thereon for independent substantially only radial movement along said radial track.

* * * * *